Nov. 11, 1947.   R. E. GRILLS   2,430,504
POWER OPERATED MEAT SAW
Filed May 16, 1945   3 Sheets-Sheet 2

Inventor
Roy Edward Grills,

By Clarence A. O'Brien
and Harvey B. Jacobson
Attorneys

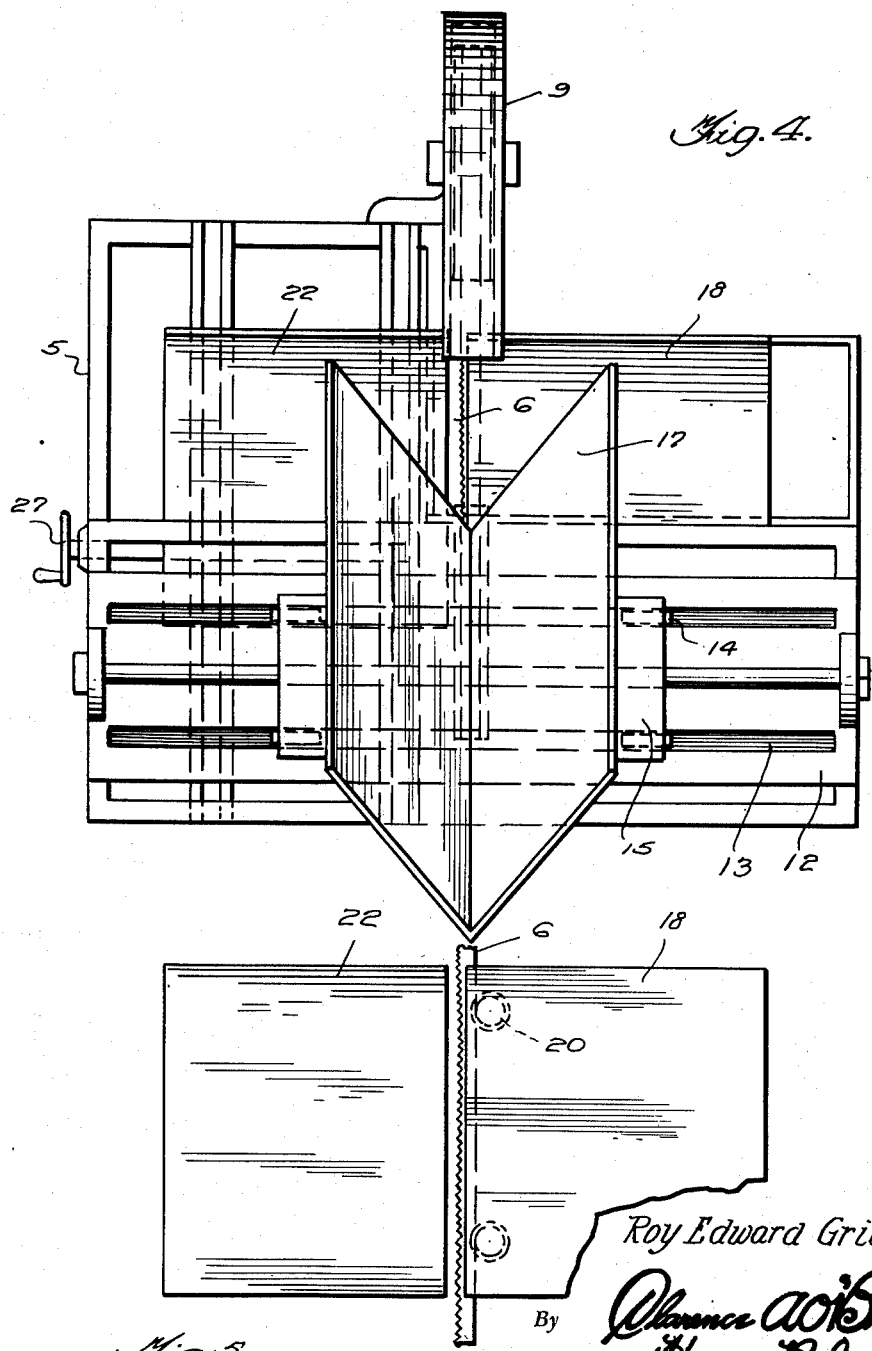

Patented Nov. 11, 1947

2,430,504

UNITED STATES PATENT OFFICE 2,430,504

POWER OPERATED MEAT SAW

Roy Edward Grills, Memphis, Tenn.

Application May 16, 1945, Serial No. 594,066

1 Claim. (Cl. 146—88)

The present invention relates to new and useful improvements in apparatus for sawing meat and more particularly to a power operated band saw together with means for feeding the meat to the saw by gravity to avoid the usual danger of the operator's hand coming into contact with the saw.

A further object of the invention is to provide a power operated meat saw of this character with a deflecting plate at the back of the saw and against which the uncut side of the meat is adapted to rest during the cutting action whereby to prevent bone dust from coming into contact with the uncut portion of the meat.

A further object of the invention is to provide an inclined gauge plate against which the severed portion of the meat is adapted to fall in a direction away from the saw whereby to prevent the severed portion of the meat from being smeared with bone dust carried by the saw blade.

A still further object of the invention is to provide an apparatus of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a top plan view, and

Figure 5 is a view in elevation of the deflecting plate and adjustable gauge plate.

Figure 1:
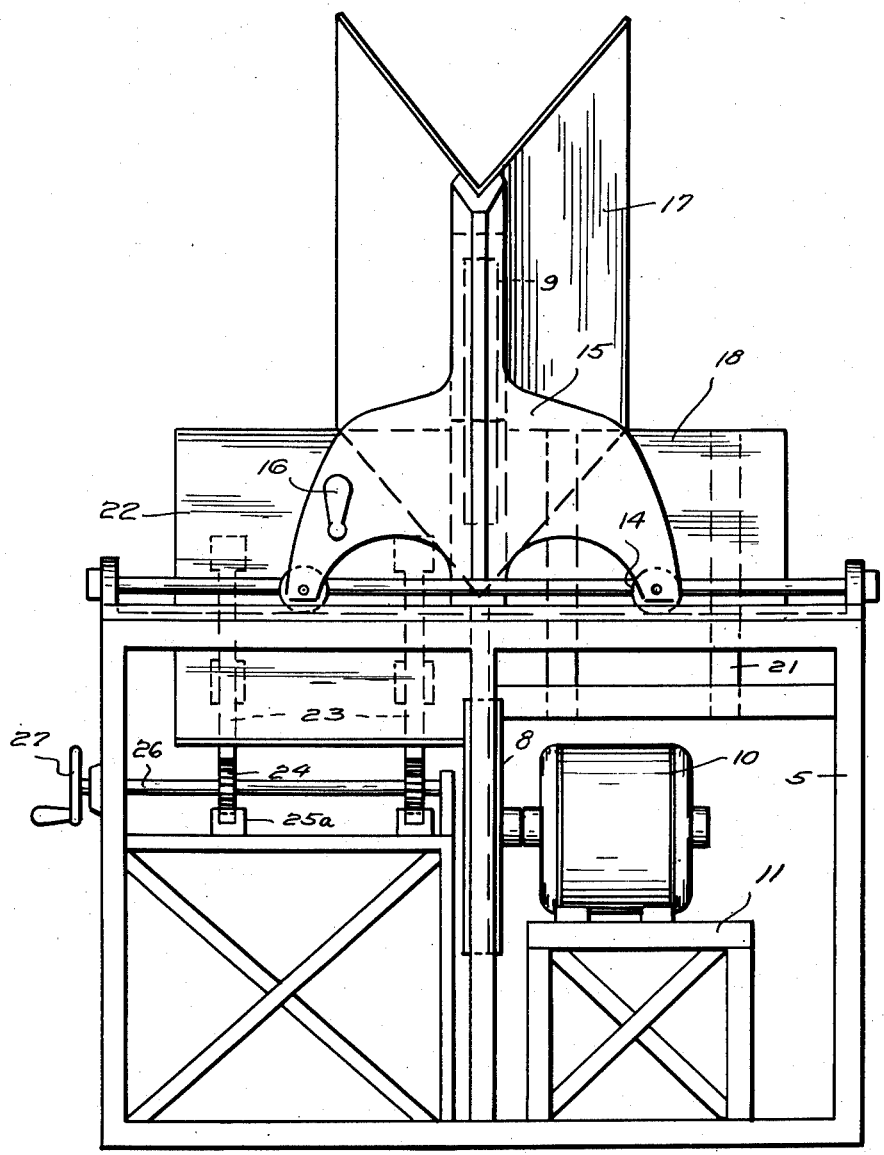
Figure 1 is a side elevational view.

Referring now to the drawings in detail wherein for the purpose of illustration I have disclosed a preferred embodiment of my invention, the numeral 5 designates a suitable supporting frame for a band saw 6 traveling around upper and lower pulleys 7 and 8, the upper pulley and the upper portion of the upper and lower flights of the saw being enclosed in a guard 9.

Figures 2, 3:
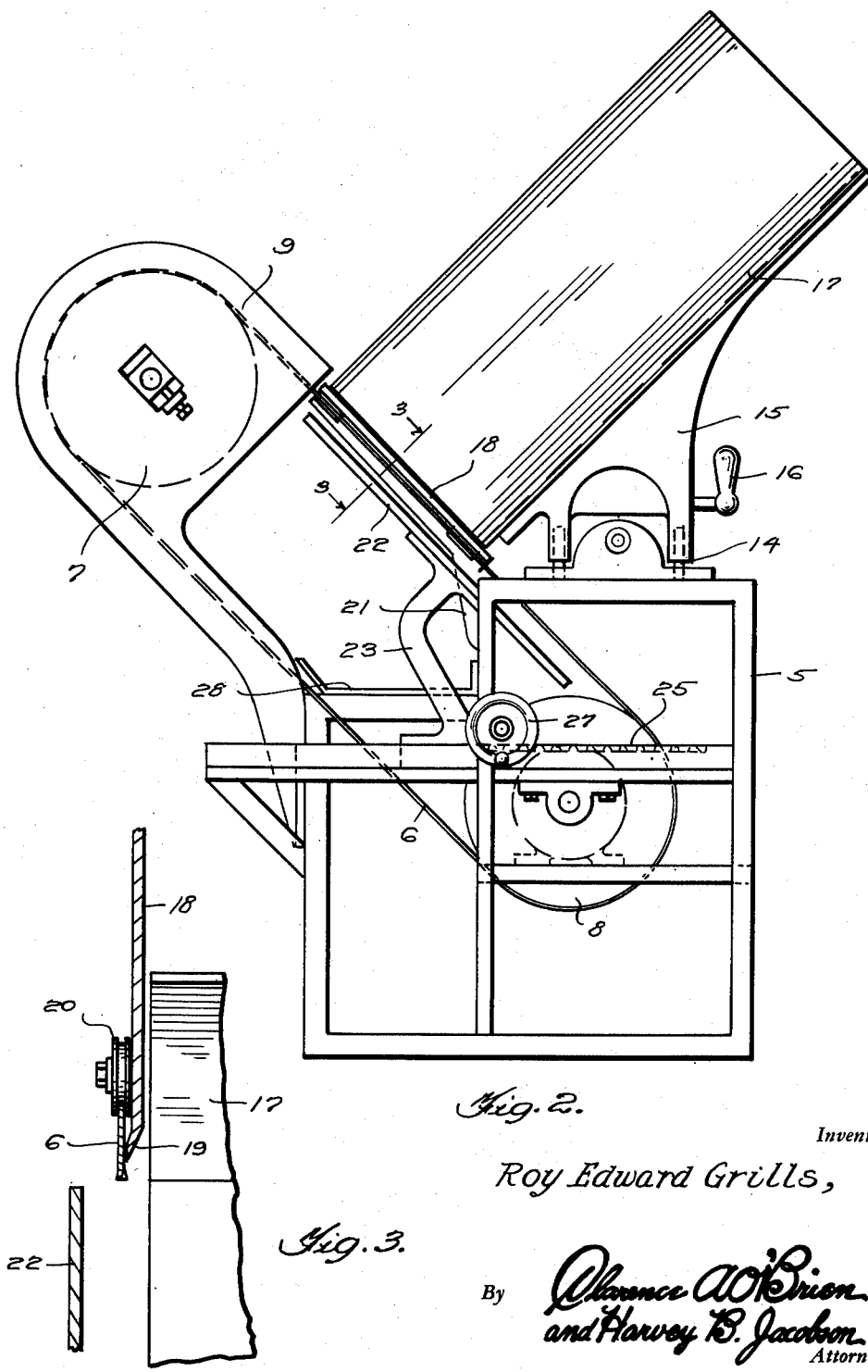
Figure 2 is a front elevational view.
Figure 3 is a fragmentary sectional view of the deflecting plate for the back of the saw.

The saw is mounted to travel at an angle of approximately 45 degrees as indicated in Figure 2 of the drawings and the lower pulley 8 is driven from the shaft of an electric motor 10 mounted on a suitable support 11 of the frame.

The upper portion of the frame 5 is provided with a platform 12 in which a pair of spaced parallel slots 13 are formed providing tracks in the platform for rollers 14 on the underside of a feed carriage 15, the carriage being adapted to travel transversely with respect to the cutting edge of the saw 6.

A handle 16 projects from the rear portion of the carriage 15 for manually moving the carriage.

A substantially V-shaped trough or chute 17 is supported on the upper edge of the carriage 15 and disposed at an angle of approximately 45 degrees and with the lower edge of the chute terminating adjacent and disposed in spaced parallel relation to the upper flight of the saw 6.

A deflector plate 18 is positioned between the lower end of the chute 17 and the upper flight of the saw 6, the deflector plate being positioned parallel to the flight of the saw and with one edge bent angularly and inclined in a direction toward the front surface of the saw as shown to advantage in Figure 3 of the drawings and in substantially closed spaced relation with respect thereto, the inclined edge of the deflector plate terminating adjacent the teeth of the saw.

To the back of the deflector plate 18 adjacent the inclined edge 19 thereof, are journaled a plurality of grooved guide rollers 20 in which the rear edge of the saw is adapted to travel.

The deflector plate 18 forms a stop for an uncut piece of meat positioned in the chute 17 and which gravitates downwardly into a position for cutting a slice therefrom by the saw 6, the deflector plate thus preventing the uncut edge of the meat from coming into contact with the side of the saw and thereby prevents bone dust carried by the saw from smearing the uncut side of the meat.

The deflector plate 18 is supported in a fixed position on the frame 5 by means of a bracket 21.

A gauge plate 22 is positioned in spaced relation from the lower end of the chute 17 and is supported on a pair of brackets 23 having horizontal rack bars 25 at their lower ends slidable in channeled tracks 25a, the racks being engaged by pinions 24 secured on a shaft 26 and operated at one end by a wheel 27 at one side of the frame.

Accordingly, through the operation of the wheel 27 the pinions 24 are adapted to slidably operate the racks 25 to move the gauge plate 22 toward or away from the rear end of the chute 17 to thus regulate the thickness of the slice of meat being cut by the saw.

The gauge plate 22 is also supported at an inclined angle and with one edge parallel to and slightly spaced from the teeth of the saw 6 as shown to advantage in Figures 3 and 5 of the drawings so that the slice of meat will fall away from the saw and prevent smearing of the meat with the bone dust carried by the saw.

A receiving tray 28 is supported on the upper portion of the frame 5 to catch the sliced meat.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having thus described the invention, what I claim is:

A meat sawing machine comprising a support, a band saw mounted on the support for traveling at a vertically inclined angle, a carriage mounted to travel on the support transversely of the direction of travel of the saw, a chute supported at a vertically inclined angle on the carriage and at right angles to the saw for feeding meat by gravity to the saw, a stationary deflector plate supported in a position in advance of the saw to function as a stop to prevent the uncut portion of the meat from coming into contact with the saw, and guide rollers on the deflector plate for the back edge of the saw.

ROY EDWARD GRILLS.

REFERENCES CITED

The following references are of record in the file of this patent:

UNITED STATES PATENTS

| Number | Name | Date |
| --- | --- | --- |
| 1,427,661 | Walker | Aug. 29, 1922 |
| 1,543,343 | Sivertsen | June 23, 1925 |
| 1,788,920 | Laeffler | Jan. 13, 1931 |
| 2,167,015 | Waage | July 25, 1939 |
| 469,177 | Sperry | Feb. 16, 1892 |